(12) United States Patent
Liang

(10) Patent No.: US 9,682,364 B2
(45) Date of Patent: Jun. 20, 2017

(54) METHOD FOR SUPPORTING NANO-TITANIUM DIOXIDE ON TITANIUM WHITE POWDER, AND NANO-PHOTOCATALYST AIR-PURIFICATION WALL PAINT

(71) Applicant: Dongguan Tomorrow Nano Technology Co., Ltd, Dongguan (CN)

(72) Inventor: Lan Liang, Dongguan (CN)

(73) Assignee: DOGNGUAN TOMORROW NANO TECHNOLOGY CO., LTD., Dongguan (CN)

( * ) Notice: Subject to any disclaimer, the term of this patent is extended or adjusted under 35 U.S.C. 154(b) by 14 days.

(21) Appl. No.: 14/648,396

(22) PCT Filed: Aug. 22, 2014

(86) PCT No.: PCT/CN2014/084970
§ 371 (c)(1),
(2) Date: May 29, 2015

(87) PCT Pub. No.: WO2015/027858
PCT Pub. Date: Mar. 5, 2015

(65) Prior Publication Data
US 2016/0089656 A1    Mar. 31, 2016

(30) Foreign Application Priority Data
Aug. 27, 2013   (CN) .......................... 2013 1 0379464

(51) Int. Cl.
| | | |
|---|---|---|
| *B01J 21/06* | (2006.01) | |
| *B01J 37/02* | (2006.01) | |
| *B01J 35/00* | (2006.01) | |
| *C09D 7/12* | (2006.01) | |
| *C09D 1/00* | (2006.01) | |
| *C09D 5/14* | (2006.01) | |
| *C09C 1/36* | (2006.01) | |

(52) U.S. Cl.
CPC ........... *B01J 21/063* (2013.01); *B01J 35/004* (2013.01); *B01J 37/0221* (2013.01); *C09C 1/36* (2013.01); *C09D 1/00* (2013.01); *C09D 5/14* (2013.01); *C09D 7/12* (2013.01); *C09D 7/1225* (2013.01); *C01P 2004/64* (2013.01)

(58) Field of Classification Search
CPC .... B01J 21/063; B01J 35/004; B01J 37/0221; C09D 1/00; C09D 7/12; C09D 5/14; C09D 7/1225; C09C 1/36
See application file for complete search history.

(56) References Cited

U.S. PATENT DOCUMENTS

| | | | |
|---|---|---|---|
| 6,197,879 B1 * | 3/2001 | Fischer ................. | C08F 212/04 524/431 |
| 2012/0118318 A1 * | 5/2012 | Hillebrandt Poulsen . | C09C 1/30 134/1.3 |

* cited by examiner

*Primary Examiner* — Melvin C Mayes
*Assistant Examiner* — Michael Forrest
(74) *Attorney, Agent, or Firm* — Shimokaji IP

(57) ABSTRACT

A method for supporting nano-titanium dioxide on titanium white powder includes: adding titanium white power into purified water and slowly stirring; adding both a surfactant and a dispersant to produce thick liquid; heating the thick liquid to 60° C.~100° C., slowly adding nano-titanium dioxide, and quickly cooling to 40° C. within three minutes; and continuing to stir for three to four hours. The method solves the problem of nano-titanium dioxide easily agglomerating in a coating, and improves the stability of nano-titanium dioxide coating. A coating containing the nano-titanium dioxide prepared by the method and a method for preparing the coating are also provided.

4 Claims, No Drawings

METHOD FOR SUPPORTING NANO-TITANIUM DIOXIDE ON TITANIUM WHITE POWDER, AND NANO-PHOTOCATALYST AIR-PURIFICATION WALL PAINT

RELATED APPLICATIONS

This application claims the benefit of priority to Chinese Patent Application No. 201310379464.3, filed on Aug. 27, 2013, which is hereby incorporated by reference in its entirety.

FIELD OF THE INVENTION

The present invention relates in general to coating technology, and more particularly to nano-photocatalyst air purification wall paint and a preparation method thereof.

BACKGROUND OF THE INVENTION

Scientific studies show that: the release of harmful substances such as formaldehyde, benzene and the like in home decorative materials continues 10~15 years, or even longer, which seriously affects the life and health of occupants. Therefore, increasingly demands are put forward in environmental performance of the decorative materials. The environmental performance of wall paint especially draws the attention of the public because the wall paint acts as the main material of interior decoration. Currently, the conventional environment-friendly wall paints mainly include water-based paint, latex paint, multicolor paint, enamel paint and so on. These types of wall paints can not absorb and eliminate formaldehyde, benzene and other harmful substances released by other decorative materials although they are substantially free of the formaldehyde, benzene and other harmful organic substances.

Some air-purification wall paints that can absorb and eliminate harmful compounds in the air have been gradually invented with the study of the wall paint. As disclosed in CN Patent Application No. 201010578500.5, for example, a bamboo charcoal wall paint containing bamboo charcoal factor and anion additive is disclosed, the bamboo charcoal factor is able to adsorb and decompose formaldehyde, ammonia, benzene and other harmful gases in the air, and the anion additive is able to release anions. However, as we all known, the bamboo charcoal factor has a certain adsorption capacity, which would not adsorb harmful substances in the air once the adsorption capacity becomes saturated, and thereby lose its effectiveness. In addition, the harmful substances adsorbed in the bamboo charcoal factor will inevitably cause secondary pollution as can not be decomposed or degraded timely and then deposited in the wall paint.

Research found that anatase nano-titanium dioxide can produce hydroxyl radicals (OH—) and negative oxygen ions ($O_2^-$) after absorbing light energy, which has strong redox ability and can decompose and oxidize pollutants in the air, so as to achieve the purpose of air-purification. The nano-titanium dioxide under 10 nanometers has particularly excellent photocatalytic properties. Thus, the wall paint manufacturers are trying to add anatase nano-titanium dioxide into the wall paint, as disclosed in CN Patent Application No. 201010624630.8. However, the nano-titanium dioxide sol easily flocculates to enlarge particle size and then precipitates once it is added into a coating system during practical production, and the photocatalytic property of the nano-titanium dioxide coating is greatly reduced or even lost after flocculation. The prior art has not solve the problems of compatibility of the anatase nano-titanium dioxide sol under 10 nanometers and the coating system, and dispersion of nano-titanium dioxide particles in the coating system.

SUMMARY OF THE INVENTION

The present invention provides a method for supporting nano-titanium dioxide on titanium white powder, a nano-photocatalyst air purification wall paint containing the nano-titanium dioxide prepared by the above method and a preparation method thereof to overcome the drawbacks of the prior art. Firstly supporting nano-titanium dioxide on titanium white power, secondly adding it to a coating system, thereby solving the technical problems of nano-titanium dioxide easily agglomerating and flocculating in a coating, and significantly improving the stability and anti-interference of purification capacity of nano-titanium dioxide, which has a very important practical significance.

The present invention provides a method for supporting nano-titanium dioxide on titanium white powder, the method includes:

step A, weighing following components according to following mass percentages respectively:

| | |
|---|---|
| nano-titanium dioxide | 10%~30%, |
| titanium white power | 0.1%~10%, |
| surfactant | 0.1%~6%, |
| dispersant | 0.1%~3%, |
| purified water | the rest; | step B, adding the titanium white power into the purified water and slowly stirring, adding both the surfactant and the dispersant during the process of stirring to produce thick liquid;

step C, heating the thick liquid obtained in step B to 60° C.~100° C., slowly adding the nano-titanium dioxide, then quickly cooling to 40° C. within three minutes, and continuing to stir for three to four hours, thereby the nano-titanium dioxide being supported on the titanium white powder to obtain the titanium white powder with the nano-titanium dioxide supported thereon.

The surfactant is selected from a group consisting of anionic surfactants such as fatty acid, fatty alcohol sulfonic ester, alkyl sulfonic ester and the like, cationic surfactants such as aliphatic amine salt, quaternary ammonium salt and the like, amphoteric surfactants such as amino acid and betaine derivative, and nonionic surfactants such as fatty alcohol ethoxylate, alkylphenol ethoxylate and the like.

The surfactant is fluoride-containing surfactant, such as FC-4430 or FC-4432.

The dispersant is anionic dispersant, such as sodium oleate, carboxylate, sulfate ester salt, sulphonate and so on.

A nano-photocatalyst air purification wall paint containing the titanium white powder with the nano-titanium dioxide supported thereon prepared by the above method.

The nano-photocatalyst air purification wall paint contains following components according to following mass percentages:

| | |
|---|---|
| the titanium white powder with the nano-titanium dioxide supported thereon | 1%~20%, |
| filler | 30%~40%, |
| additive | 0.1%~10%, |
| surfactant | 0.1%~6%, |

-continued

| | |
|---|---|
| dispersant | 0.1%~3%, |
| purified water | the rest. |

The surfactant is selected from a group consisting of anionic surfactants, cationic surfactants, amphoteric surfactants, and nonionic surfactants. The surfactant is fluoride-containing surfactant, such as FC-4430 or FC-4432.

The filler is selected from a group consisting of calcium carbonate, diatomaceous earth, kaolin, talc and any combination thereof.

The additive is selected from a group consisting of fungicide, mould inhibitor, wetting agent, defoamer, antifreeze, PH regulator, thickener, flow agent and any combination thereof.

A method for preparing the above nano-photocatalyst air purification wall paint, includes:

step D, weighing the following components according to the following mass percentages respectively:

| | |
|---|---|
| the titanium white powder with the nano-titanium dioxide supported thereon | 1%~20%, |
| the filler | 30%~40%, |
| the additive | 0.1%~10%, |
| the surfactant | 0.1%~6%, |
| the dispersant | 0.1%~3%, |
| the purified water | the rest; | adding the purified water into the titanium white powder with the nano-titanium dioxide supported thereon at room temperature, adding the filler therein under a process of slowly stirring and mixing well to obtain a mixture;

step E, slowly adding the surfactant, the dispersant and the additive into the mixture obtained in step D and mixing well to obtain the nano-photocatalyst air purification wall paint.

The dispersant is anionic dispersant, such as sodium oleate, carboxylate, sulfate ester salt, sulphonate and so on.

The filler is selected from a group consisting of calcium carbonate, diatomaceous earth, kaolin, talc and any combination thereof.

The additive is selected from a group consisting of fungicide, mould inhibitor, wetting agent, defoamer, antifreeze, PH regulator, thickener, flow agent and any combination thereof.

The fungicide is methylisothiazolinone; the mould inhibitor is carbendazim, iso-octylisothiazolinone or a mixture thereof.

The wetting agent is siloxane copolymers selected from nonionic surfactant.

The defoamer is water-based paint defoamer.

The PH regulator is organic ammonia AMP95.

The antifreeze is propylene glycol.

The thickener is selected from water-based polyurethane and hydrophobic acrylic liquid.

The beneficial effects of the present invention are: the method for supporting nano-titanium dioxide on titanium white powder includes simple process steps to support nano-titanium dioxide on titanium white powder, which thereby solves the technical problems of nano-titanium dioxide easily agglomerating and flocculating in a coating, and significantly improves the stability and anti-interference of the coating system, enables the coating to permanently decompose all kinds of organic pollutants (such as formaldehyde, benzene, TVOC and so on), bacteria and some inorganic pollutants (such as ammonia, NOX and so on), and eventually degrades them to carbon dioxide, water and other harmless substances.

DETAILED DESCRIPTION OF ILLUSTRATED EMBODIMENTS

Embodiment 1

A method for supporting nano-titanium dioxide on titanium white powder includes:

step A, weighing following components according to following mass percentages respectively:

| | |
|---|---|
| nano-titanium dioxide | 25%, |
| titanium white power | 5%, |
| surfactant | 3%, |
| dispersant | 2%, |
| purified water | 65%; | step B, adding the titanium white power into the purified water and slowly stirring, adding both the surfactant and the dispersant during the process of stirring to produce thick liquid;

step C, heating the thick liquid obtained in step B to 80° C., slowly adding the nano-titanium dioxide, then quickly cooling to 40° C. within three minutes, and continuing to stir for 3.5 hours, thereby the nano-titanium dioxide being supported on the titanium white powder to obtain the titanium white powder with the nano-titanium dioxide supported thereon.

The constituent of the titanium white power is micron-sized titanium dioxide.

The surfactant is fatty alcohol sulfonic ester selected from anionic surfactants.

The dispersant is sodium oleate.

Embodiment 2

A method for supporting nano-titanium dioxide on titanium white powder includes:

step A, weighing the following components according to the following mass percentages respectively:

| | |
|---|---|
| the nano-titanium dioxide | 30%, |
| the titanium white power | 10%, |
| the surfactant | 6%, |
| the dispersant | 0.1%, |
| the purified water | 53.9%; | step B, adding the titanium white power into the purified water and slowly stirring, adding both the surfactant and the dispersant during the process of stirring to produce thick liquid;

step C, heating the thick liquid obtained in step B to 60° C., slowly adding the nano-titanium dioxide, then quickly cooling to 40° C. within three minutes, and continuing to stir for four hours, thereby the nano-titanium dioxide being supported on the titanium white powder to obtain the titanium white powder with the nano-titanium dioxide supported thereon.

The surfactant is fluoride-containing surfactant FC-4430.

The dispersant is carboxylate.

Embodiment 3

A method for supporting nano-titanium dioxide on titanium white powder includes:

step A, weighing the following components according to the following mass percentages respectively:

| | |
|---|---|
| the nano-titanium dioxide | 10%, |
| the titanium white power | 0.1%, |
| the surfactant | 0.1%, |
| the dispersant | 3%, |
| the purified water | 86.8%; | step B, adding the titanium white power into the purified water and slowly stirring, adding both the surfactant and the dispersant during the process of stirring to produce thick liquid;

step C, heating the thick liquid obtained in step B to 100° C., slowly adding the nano-titanium dioxide, then quickly cooling to 40° C. within three minutes, and continuing to stir for four hours, thereby the nano-titanium dioxide being supported on the titanium white powder to obtain the titanium white powder with the nano-titanium dioxide supported thereon.

The surfactant is alkylphenol ethoxylate selected from the nonionic surfactants.

The dispersant is sulphonate.

Embodiment 4

A method for preparing nano-photocatalyst air purification wall paint with the titanium white powder with the nano-titanium dioxide supported thereon prepared by embodiment 1 includes:

step D, weighing the following components according to the following mass percentages respectively:

| | |
|---|---|
| the titanium white powder with the nano-titanium dioxide supported thereon prepared by embodiment 1 | 10%, |
| filler | 35%, |
| additive | 5%, |
| surfactant | 3%, |
| dispersant | 2%, |
| purified water | 45%; | adding the purified water into the titanium white powder with the nano-titanium dioxide supported thereon at room temperature, adding the filler therein under a process of slowly stirring and mixing well to obtain a mixture;

step E, slowly adding the surfactant, the dispersant and the additive into the mixture obtained in step D and mixing well to obtain the nano-photocatalyst air purification wall paint.

The surfactant is a mixture of fatty acid and alkyl sulfonic ester.

The filler is talc.

The additive is fungicide, mould inhibitor, wetting agent, defoamer, antifreeze, PH regulator, thickener or flow agent.

The fungicide is methylisothiazolinone.

The wetting agent is siloxane copolymers selected from nonionic surfactant.

The defoamer is water-based paint defoamer.

The PH regulator is organic ammonia AMP95.

The antifreeze is propylene glycol.

The thickener is selected from water-based polyurethane and hydrophobic acrylic liquid.

Embodiment 5

A method for preparing nano-photocatalyst air purification wall paint by the titanium white powder with the nano-titanium dioxide supported thereon prepared by embodiment 1 includes:

step D, weighing the following components according to the following mass percentages respectively:

| | |
|---|---|
| the titanium white powder with the nano-titanium dioxide supported thereon | 20%, |
| the filler | 30%, |
| the additive | 10%, |
| the surfactant | 0.1%, |
| the dispersant | 3%, |
| the purified water | 39.9%; | adding the purified water into the titanium white powder with the nano-titanium dioxide supported thereon at room temperature, adding the filler therein under a process of slowly stirring and mixing well to obtain a mixture;

step E, slowly adding the surfactant, the dispersant and the additive into the mixture obtained in step D and mixing well to obtain the nano-photocatalyst air purification wall paint.

The surfactant is fluoride-containing surfactant FC-4432.

The dispersant is a mixture of sulfate ester salt and sulphonate selected from anionic dispersant.

The filler is talc.

The additive is selected from a group consisting of fungicide, mould inhibitor, wetting agent, defoamer, antifreeze, PH regulator, thickener, flow agent and any combination thereof.

The fungicide is methylisothiazolinone; the mould inhibitor is carbendazim, iso-octylisothiazolinone or a mixture thereof.

The wetting agent is siloxane copolymers selected from nonionic surfactant.

The defoamer is water-based paint defoamer.

The PH regulator is organic ammonia AMP95.

The antifreeze is propylene glycol.

The thickener is selected from water-based polyurethane and hydrophobic acrylic liquid.

Embodiment 6

A method for preparing nano-photocatalyst air purification wall paint by the titanium white powder with the nano-titanium dioxide supported thereon prepared by embodiment 1 includes:

step D, weighing the following components according to the following mass percentages respectively:

| | |
|---|---|
| the titanium white powder with the nano-titanium dioxide supported thereon | 1%, |
| the filler | 40%, |
| the additive | 0.1%, |
| the surfactant | 6%, |
| the dispersant | 0.1%, |
| the purified water | 52.8%; | adding the purified water into the titanium white powder with the nano-titanium dioxide supported thereon at room temperature, adding the filler therein under a process of slowly stirring and mixing well to obtain a mixture;

step E, slowly adding the surfactant, the dispersant and the additive into the mixture obtained in step D and mixing well to obtain the nano-photocatalyst air purification wall paint.

The surfactant is a mixture of fatty alcohol ethoxylate and alkylphenol ethoxylate.

The dispersant is a mixture of carboxylate and sulfate ester salt.

The filler is talc.

The additive is selected from a group consisting of fungicide, mould inhibitor, wetting agent, defoamer, antifreeze, PH regulator, thickener, flow agent and any combination thereof.

The fungicide is methylisothiazolinone; the mould inhibitor is carbendazim, iso-octylisothiazolinone or a mixture thereof.

The wetting agent is siloxane copolymers selected from nonionic surfactant.

The defoamer is water-based paint defoamer.

The PH regulator is organic ammonia AMP95.

The antifreeze is propylene glycol.

The thickener is selected from water-based polyurethane and hydrophobic acrylic liquid.

In order to detect the performance of the nano-photocatalyst air purification wall paint of the present invention, a brand of commercially available nano-photocatalyst air purification wall paint the applicant selected serves as the control group, and the performance of coating prepared in the embodiment 4 is detected by comparison testing. The according methods and results are as follows:

Detecting subjects: two newly renovated home indoor pollution spaces with the same structure and the same net area of 40 square meters in the same layer and same building. Respectively applying the coating of the control group and that of embodiment 4 on the indoor walls, and shutting the doors and windows of the detecting subjects for 12 hours on 5th, 10th and 20th days so as to collect air after the coatings are dried. Detecting the contents of formaldehyde, ammonia, benzene homologues and total volatile organic compounds, the according detection methods and detection results are shown in table 1.

TABLE 1 performance comparison of the control sample and the embodiment 4 in capacity of decomposing air pollutants

| Detection items | Detection methods | Control sample | | | Coating compared in embodiment 4 | | | standard values |
|---|---|---|---|---|---|---|---|---|
| | | 5th day | 10th day | 20th day | 5th day | 10th day | 20th day | |
| formaldehyde | GB/T 18204.26-2000; | 0.2 | 0.18 | 0.15 | 0.18 | 0.12 | 0.08 | ≤0.12 |
| ammonia | GB/T 18204.25-2000 | 0.8 | 0.7 | 0.6 | 0.7 | 0.5 | 0.3 | ≤0.5 |
| benzene homologues (benzene, toluene, and dimethylbenzene) | GB/T 11737-89 | 0.14 | 0.12 | 0.10 | 0.10 | 0.08 | 0.06 | ≤0.09 |
| total volatile organic compounds (TVOC) | GB 50325-2010 appendix E | 1.0 | 0.9 | 0.8 | 0.7 | 0.6 | 0.4 | ≤0.6 |

Compared with the commercially available nano-photocatalyst air purification wall paint, the nano-photocatalyst air purification wall paint of the present invention has a faster and stronger capacity of decomposing formaldehyde, ammonia, benzene and volatile organic compounds in air.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for supporting nano-titanium dioxide on titanium white powder, comprising:
   step A, weighing following components according to following mass percentages respectively:

| | |
|---|---|
| nano-titanium dioxide | 10%~30%, |
| titanium white power | 0.1%~10%, |
| surfactant | 0.1%~6%, |
| dispersant | 0.1%~3%, |
| purified water | the rest; | step B, adding the titanium white power into the purified water and stirring, adding both the surfactant and the dispersant during the process of stirring to produce thick liquid;
   step C, heating the thick liquid obtained in step B to 60° C. ~100° C., adding the nano-titanium dioxide, then quickly cooling to 40° C. within three minutes, and continuing to stir for three to four hours, thereby the nano-titanium dioxide being supported on the titanium white powder to obtain the titanium white powder with the nano-titanium dioxide supported thereon.

2. The method for supporting nano-titanium dioxide on titanium white powder according to claim 1, wherein the surfactant is selected from a group consisting of anionic surfactants, cationic surfactants, amphoteric surfactants, and nonionic surfactants, the anionic surfactants include fatty acid, fatty alcohol sulfonic ester and alkyl sulfonic ester, the cationic surfactants include aliphatic amine salt and quaternary ammonium salt, the amphoteric surfactants include amino acid and betaine derivative, and the nonionic surfactants include fatty alcohol ethoxylate and alkylphenol ethoxylate.

3. The method for supporting nano-titanium dioxide on titanium white powder according to claim 1, wherein the surfactant is selected from fluoride-containing surfactant FC-4430 or fluoride-containing surfactant FC-4432.

4. The method for supporting nano-titanium dioxide on titanium white powder according to claim 1, wherein the dispersant is selected from a group consisting of sodium oleate, carboxylate, sulfate ester salt, sulphonate and any combination thereof.

* * * * *

UNITED STATES PATENT AND TRADEMARK OFFICE
CERTIFICATE OF CORRECTION

PATENT NO. : 9,682,364 B2
APPLICATION NO. : 14/648396
DATED : June 20, 2017
INVENTOR(S) : Lan Liang Page 1 of 1

It is certified that error appears in the above-identified patent and that said Letters Patent is hereby corrected as shown below:

On the Title Page

Item (73) ASSIGNEE'S NAME SHOULD READ:
DONGGUAN TOMORROW NANO TECHNOLOGY CO., LTD
Dongguan (CN)

Signed and Sealed this
Fifth Day of March, 2019

Andrei Iancu
*Director of the United States Patent and Trademark Office*